No. 810,361. PATENTED JAN. 16, 1906.
F. STORM.
HYDROMETER TEST JAR.
APPLICATION FILED APR. 24, 1905.
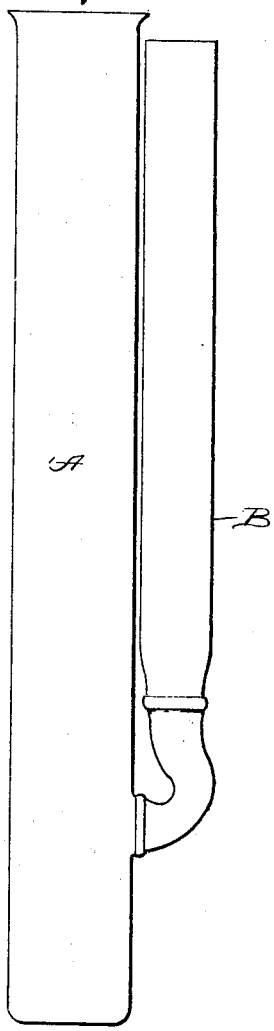
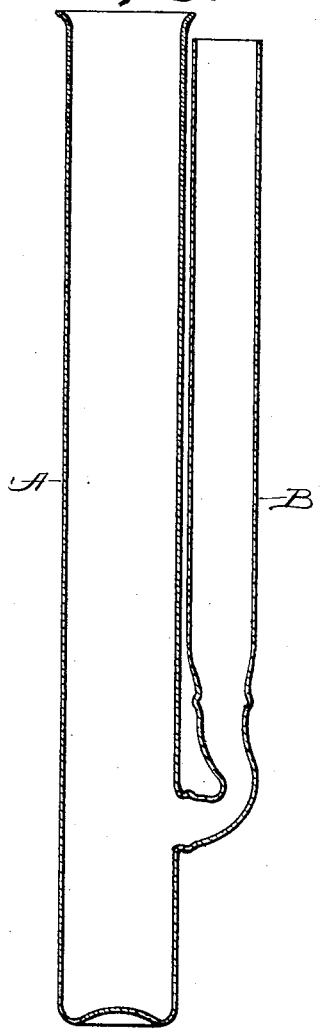
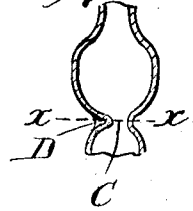
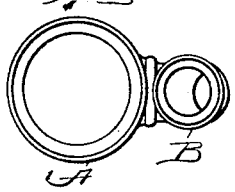
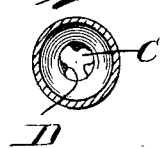
Witnesses
J. M. Fowler Jr.
Inventor
Frances Storm,
By Mason, Fenwick & Lawrence
Attorneys

UNITED STATES PATENT OFFICE.

FRANCIS STORM, OF MAYWOOD, NEW JERSEY.

HYDROMETER TEST-JAR.

No. 810,361.        Specification of Letters Patent.        Patented Jan. 16, 1906.

Application filed April 24, 1905. Serial No. 257,265.

*To all whom it may concern:*

Be it known that I, FRANCIS STORM, a citizen of the United States, residing at Maywood, in the county of Bergen and State of New Jersey, have invented certain new and useful Improvements in Hydrometer Test-Jars; and I do hereby declare the following to be a full, clear, and exact description of the invention, such as will enable others skilled in the art to which it appertains to make and use the same.

This invention relates to improvements in means for determining the specific gravity, density, and strength of any liquid by flotation.

The object of this invention is to facilitate the reading of the hydrometer and at the same time to allow of the simultaneous correction of any deviation from the usual temperature at which hydrometers are standardized.

As a rule hydrometers are adjusted to a temperature of 60°, so that when the liquid to be tested has such temperature the hydrometer will indicate its true density and specific gravity. However, since the determination of the liquid to be tested depends upon the thermometer, the use of this latter instrument becomes an absolute requisite in connection with the hydrometer. Many appliances have been devised which combine these two instruments, nearly all of which consist of metal or other material which renders a correct reading almost impossible.

My invention consists in the features and details, as will be more particularly pointed out in the claims and described in connection with the accompanying drawings, in which—

Figure 1 is a front elevation; Fig. 2, a longitudinal section; Fig. 3, a top plan view; Fig. 4, a fragmentary view showing a series of projections extending internally, and Fig. 5 is a detail section on the lines $x$ $x$ of Fig. 4.

In the drawings, A represents a hollow glass tube, preferably of circular conformation, having one end closed and adapted to receive a liquid and float. Joined to this tube at or near the bottom thereof is a similar tube B of smaller diameter and communicating with the larger tube, so as to permit a portion of the liquid which has been placed in the larger tube to flow into the same, where the temperature of the entire amount of liquid placed in the hydrometer-tube can be taken. The larger or primary tube A is designed to receive the hydrometer for testing the gravity and density of the liquid, while the smaller or auxiliary tube is arranged to receive the thermometer. Since the withdrawal of the thermometer from the metallic test-tube necessarily has a tendency to change the point of register by reason of any difference in the atmospheric temperature and that of the liquid under examination, I have constructed this device entirely of glass, so as to render the reading of both the thermometer and hydrometer very easy and possible without removing either. I do not, however, wish to be restricted to the specific use of glass, since any transparent material of U-shape formation will answer the same purpose.

In practice I have found that a thermometer inserted in the small tube B is apt to stop up the opening C. (Shown in the fragmentary view of Fig. 5.) In order to prevent this, I dent the tube B inwardly or provide the same with internal projections D near or about the opening C, upon which the thermometer may rest while the temperature of the liquid is being taken. These indentures or projections are preferably cast while the tube is hot.

Having thus described my invention, what I claim, and desire to secure by Letters Patent, is—

1. A device of the character described, comprising integral communicating tubes, and a supporting lug or extension integral with the lower inner wall of one of said tubes.

2. A device of the character described, comprising a primary tube, an auxiliary tube parallel and integral with said primary tube, said auxiliary tube of less diameter than said primary tube, and a supporting lug or extension formed integral upon the lower inner wall of said auxiliary tube.

3. A device of the character described, comprising a primary, transparent tube, an auxiliary, transparent tube parallel and integral with said primary tube, said auxiliary tube being provided with a constricted portion, and an inwardly-extending lug or extension formed upon said constricted portion.

4. A device of the character described, comprising integral, parallel tubes, one of said tubes being provided with a constricted portion, and an inwardly-projecting lug or extension formed upon the inner wall of said constricted portion.

5. A device of the character described, comprising a primary tube, an auxiliary tube parallel and integrally connected at its bottom to the lower portion of said primary tube, said auxiliary tube of less diameter than said primary tube, said auxiliary tube being provided with a constricted portion near its lower end, and an inwardly-extending lug or extension formed upon the inner wall of said constricted portion of the auxiliary tube.

6. A device of the character described, comprising integral tubes, a constricted portion formed upon one of said tubes, and article-supporting means formed upon the inner wall of the constricted portion of said tube.

7. A hydrometer test-jar comprising two hollow receptacles in direct communication with each other, one of said tubes being smaller than the other, the larger of said tubes arranged to receive a hydrometer, and the smaller of said tubes arranged to loosely receive a thermometer, the lower portion of said tube being constricted and having inwardly-extending lugs made integral with the tube, said lugs arranged to support the thermometer in said tube.

In testimony whereof I affix my signature in presence of two witnesses.

FRANCIS STORM.

Witnesses:
HUGO MOCK,
A. M. HOULIHAN.